United States Patent [19]

Amner

[11] Patent Number: 5,316,372
[45] Date of Patent: May 31, 1994

[54] HEADREST FOR A MOTOR VEHICLE

[75] Inventor: John A. Amner, Rochford, United Kingdom

[73] Assignee: Ford Motor Company, Dearborn, Mich.

[21] Appl. No.: 789,399

[22] Filed: Nov. 8, 1991

Related U.S. Application Data

[63] Continuation of Ser. No. 491,893, Mar. 12, 1990, abandoned.

[30] Foreign Application Priority Data

Sep. 10, 1987 [GB] United Kingdom ............... 8721269

[51] Int. Cl.⁵ ............................................. A47C 1/10
[52] U.S. Cl. ................................. 297/400; 297/391
[58] Field of Search ............... 297/409, 399, 400, 391, 297/409, 403; 5/468, 452

[56] References Cited

U.S. PATENT DOCUMENTS

| | | | |
|---|---|---|---|
| 3,372,407 | 3/1968 | Weber, III | 5/468 |
| 3,948,562 | 4/1976 | Grabner et al. | 297/408 |
| 4,370,898 | 2/1983 | Maruyama | 297/408 X |
| 4,563,041 | 1/1986 | Frobose | 5/468 X |
| 4,668,014 | 5/1987 | Boisset | 297/408 |
| 4,744,601 | 5/1988 | Nakanishi | 297/391 |
| 4,779,929 | 10/1988 | Küchemann | 297/408 |
| 4,840,428 | 6/1989 | Kobayashi et al. | 297/408 |
| 4,844,544 | 7/1989 | Ochiai | 297/408 |
| 4,861,107 | 8/1989 | Vidwans et al. | 297/408 |

FOREIGN PATENT DOCUMENTS 2734506  2/1979  Fed. Rep. of Germany ...... 297/391

Primary Examiner—Jose V. Chen
Attorney, Agent, or Firm—Daniel M. Stock; Roger L. May

[57] ABSTRACT

A headrest is made from a blow-molded plastic body which has a re-entrant formation over part of its surface, the fixings for securing the body to the headrest support being located inside the re-entrant formation, and the walls of the formation cooperating with the support to define the limits between which the headrest can tilt about a horizontal axis.

10 Claims, 4 Drawing Sheets

HEADREST FOR A MOTOR VEHICLE

This application is a continuation of Ser. No. 07/491,893, filed Mar. 12, 1990 now abandoned.

BACKGROUND OF THE INVENTION

This invention relates to a headrest for use with a motor vehicle seat.

A headrest is required for a motor vehicle seat to prevent the head of the seat occupant being jerked backwards in the event of a crash. The headrest therefore has to be rigid enough to restrain movement of the head, but at the same time it needs to have energy absorbing characteristics to prevent damage to the head, and also needs to be relatively soft and comfortable for use by the seat occupant under normal driving conditions.

Both headrests and head restraints are known. For purposes of this specification, head restraints are fixed structures attached to a seat back and intended to prevent neck injury in an accident. In some cases, head restraints may be able to move vertically. Headrests on the other hand, while having a primary function in preventing neck injuries, also aim to improve the comfort of the seat occupant and are able to tilt about a horizontal axis as well as being able to move up and down.

SUMMARY OF THE INVENTION

According to the present invention, there is provided a headrest for use with a motor vehicle seat, the headreast comprising a blow-molded plastic body with a molded-in insert, a support frame, and at least one friction clamp adapted to be connected to the insert and to hold the frame relative to the insert while allowing the insert and the body to tilt, wherein the insert is molded into a part of the plastic body which includes a re-entrant formation, and the walls of the formation cooperate with the support frame to limit the extent of tilting.

The re-entrant formation preferably has faces which make an angle of between 50° and 60° to one another to limit the available tilting movement of the body on the frame.

The support frame is preferably made of rod or bar suitably bent to shape. There are preferably two molded-in inserts and two friction clamps. In one embodiment, the friction clamps may themselves be molded into the plastic body.

In another embodiment, the insert has a threaded bore and the clamps are secured to the inserts by threaded fasteners.

The blow-molded plastic body preferably has an aperture through the wall of the body, and this aperture may coincide with the position through which a blow-pin is inserted during the blow-molding process.

The plastic body is preferably surrounded by a fabric cover, and a layer of foamed-in-place foam material is provided between the cover and the plastic body. The fabric and the foam preferably completely surround the support frame where this passes through the fabric and the foam, and the fabric and foam are slit (without removing any material) to allow relative movement between the support frame and the fabric and foam.

The molded body is preferably of polyethylene or polypropylene to which an adhesion promoting additive has been added.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
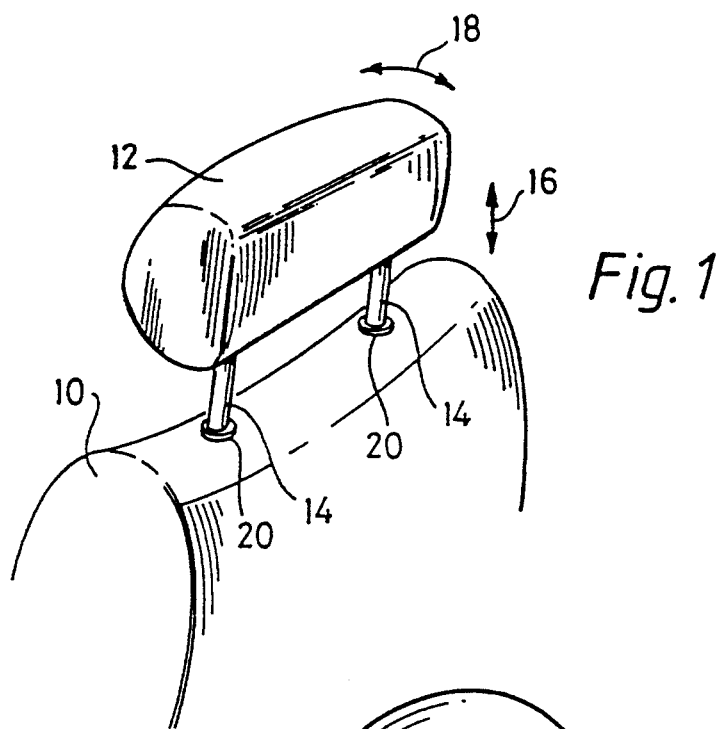
FIG. 1 is a general view of the top of a seat backrest, with a headrest according to the invention mounted thereon.

FIG. 1 shows the backrest 10 of a conventional motor vehicle seat with a padded headrest 12 mounted on the top of the seat back. The headrest 12 is mounted on two rods 14, and can move relative to the backrest 10 both up and down as indicated by the arrow 16 and by a tilting action through an arc, as indicated by the arrow 18. When the headrest moves up and down, the rods 14 move up and down in sockets 20 mounted at the top of the backrest.

Figure 2:
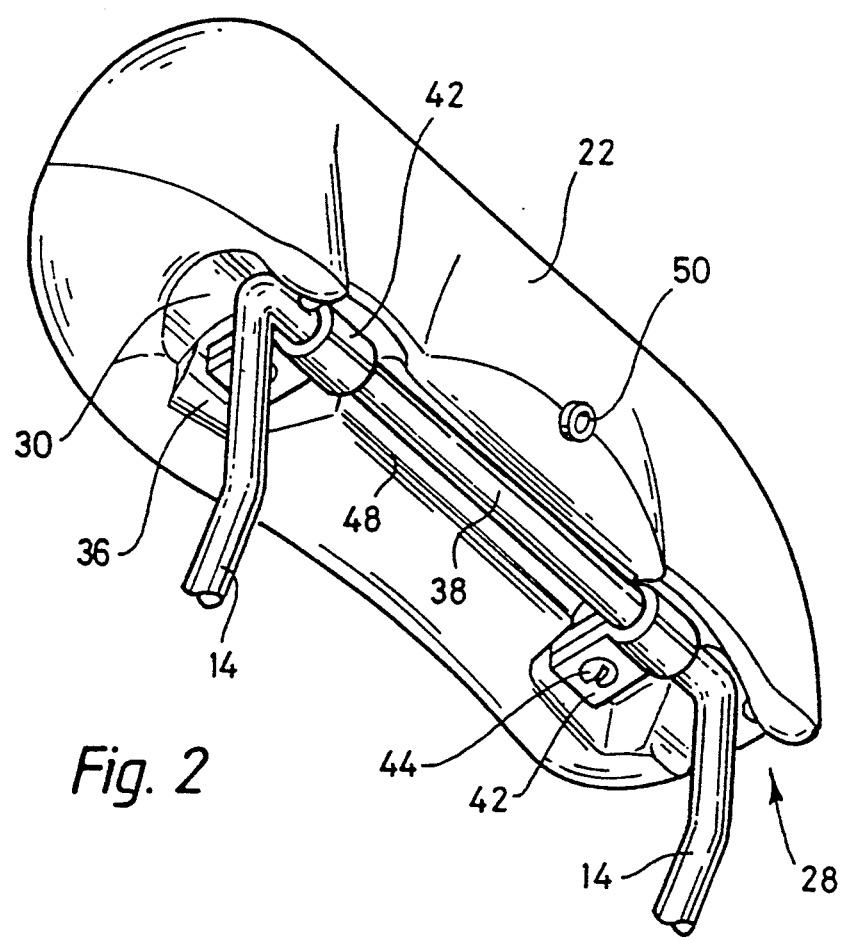
FIG. 2 is an underneath view of a headrest armature in accordance with the invention.
Figure 3:
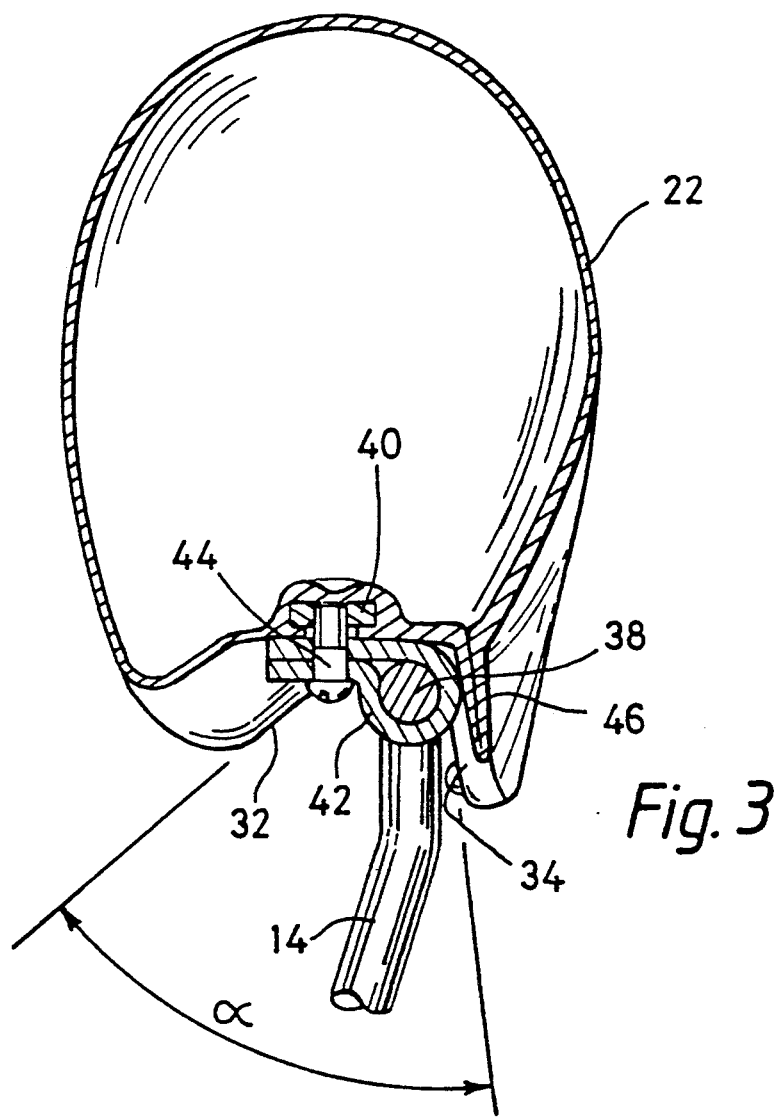
FIG. 3 is a cross-section through the armature showing one of the molded-in inserts.
Figure 4:
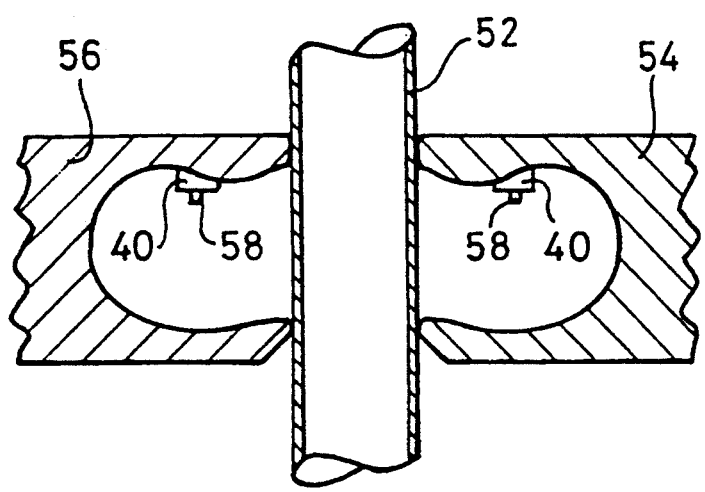
FIGS. 4, 5 and 6 illustrate sequential steps in a blow-molding operation for manufacture of the armature.
Figure 6:
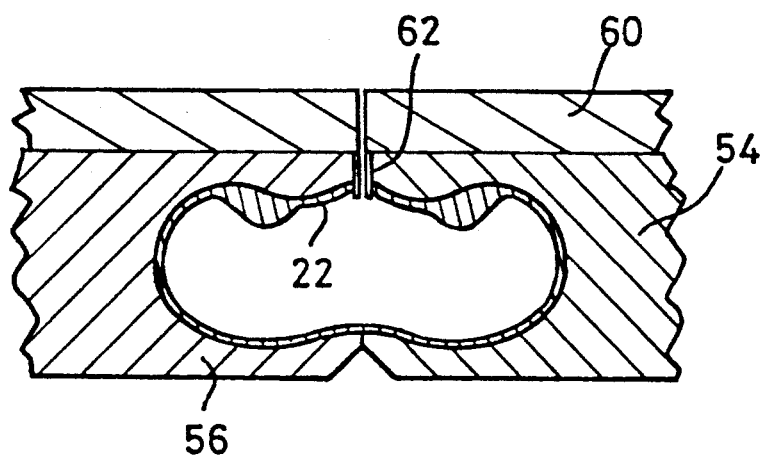
Figure 7:
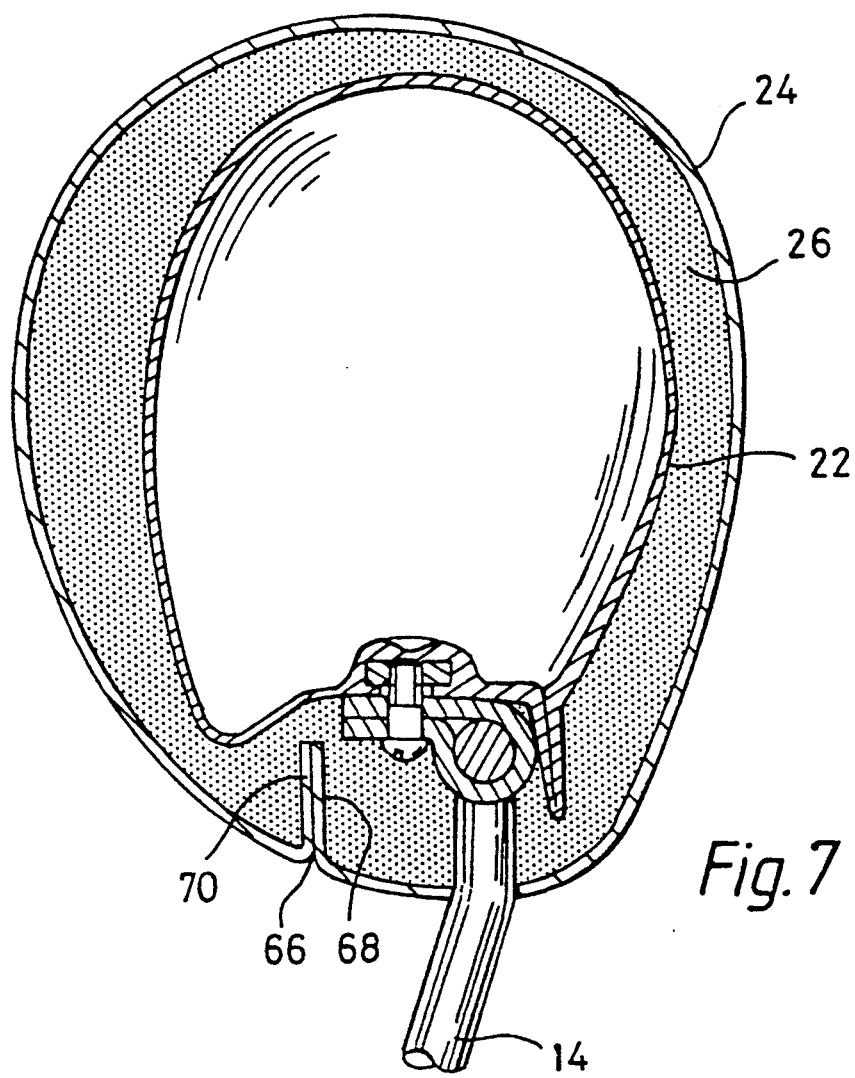
FIG. 7 is a view corresponding to FIG. 3, but showing the armature covered with a foam and fabric covering.
Figure 8:
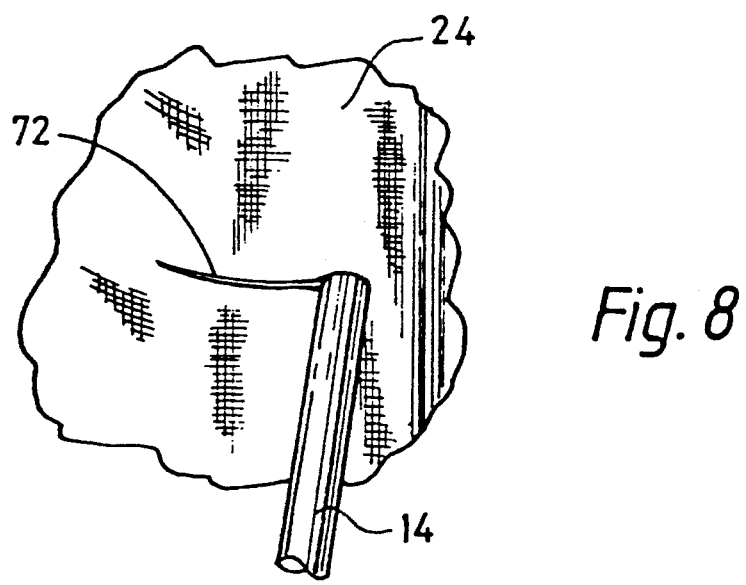
FIG. 8 is a detailed view of part of the underside of the completed headrest.

The headrest consists of a blow-molded plastic armature 22 surrounded by a fabric cover 24 and a layer of foam 26 (see FIG. 7). FIG. 2, however, shows the armature 22 without its coverings. Along the underside of the armature and formed as part of the molding process, there is a recess or re-entrant formation generally designated 28. This recess is symmetrical about a vertical center line across the headrest, and so only one side will be described in detail. At the outer end of the recess there is a portion 30 which has two tilt-limiting surfaces which determine the extent of the tilting movement indicated in FIG. 1 by the double-headed arrow 18. These two surfaces are shown in more detail in FIG. 6, where the surface which limits forward movement is designated with the reference numeral 32, and the surface which limits rearward movement is indicated by the reference numeral 34. As shown in FIG. 3, the surfaces include an angle which determines the amount of tilting available.

A second region of the recess 28 is indicated with the numeral 36 and provides a seating for a clamp which clamps the support frame including the rods 14. In this embodiment, the two rods 14 are both formed at opposite ends of a single frame and are joined at their top ends by a frame member 38. FIG. 3 is a section through one of the regions 36, and it will be seen that the armature 22 has a molded-in threaded insert 40. A P-shaped clamp 42 surrounds the frame member 38 and is attached to the insert 40 by means of a screw or bolt 44. Tightening the screw 44 controls the amount of friction exerted by the surfaces of the P-clamp 42 on the frame part 38. Also, in order to strengthen this region of the headrest, the back of the armature is stiffened by nipping together two wall parts of the armature to form a double-thickness reinforcement 46.

A third region of the recess 28 is designated with the numeral 48 and houses the horizontal part 38 of the support frame.

At the back of the armature 22 there is an aperture 50 which vents the internal cavity of the armature. This allows air to escape from the armature in the event of an impact caused by the head of the seat occupant hitting the headrest in a crash, so that the armature walls can deflect and absorb energy. If the internal cavity was sealed, the extent to which the walls of the armature could deflect would be limited.

Figure 5:
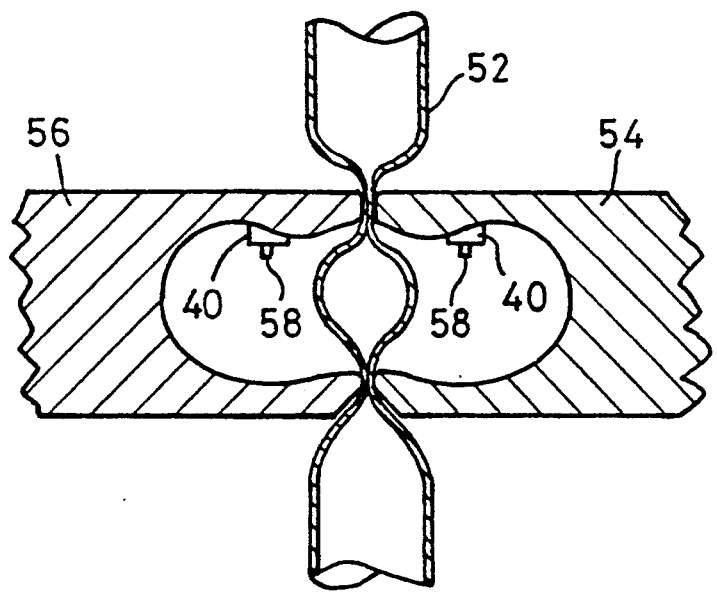

The armature is manufactured by blow-molding from a parison 52. This parison, which is tubular in form, is extruded from a polyethylene or polypropylene material to which an adhesion promoting additive has been mixed in at the plastic formulation stage. This additive may be, for example, the additive sold by Exxon under the designation EAA 566. The molding is carried out in a two-part mold, the two mold parts being designated as 54 and 56. In each mold half there is a pin 58 fixed to the mold wall; and before the molding process begins, inserts 40 are fitted over those pins and held against the mold wall by magnetic attraction. The mold halves 54 and 56 are closed as shown in FIG. 5 to nip the parison material at the top and bottom, and the parison material outside the mold cavity is then cut off and removed. A separate blowing component 60 is then mounted on the mold halves so that a blow pin 62 projects into the mold cavity inside the parison, and blowing takes place. As a result of this blowing, the parison material is forced to the sides of the cavity and encapsulates the inserts 40. The armature is then removed from the mold in a conventional manner.

Once the molding of the armature has been completed, the support frame 14, 38 is connected in the manner shown in FIG. 3. Subsequently, the armature is inserted into a fabric envelope 24 through a longitudinal opening at 66. The longitudinal opening is constructed so that it has two internal parallel flaps 68 and 70. The envelope 24 is rather larger than the armature, so that a free space is left between the two, and this free space is then filled with foam 26 which is introduced into the space by a "foaming-in-place" technique. The foam components are introduced by a nozzle which is inserted through the opening 66 and the foaming action effectively fills all the internal space of the envelope 24 around the armature. The size of the aperture 50 in the armature, however, will be such that foam will not penetrate inside the armature, and FIG. 7 shows that the volume of foam required to produce the headrest is very substantially less than would be required if the whole of the interior of the envelope 24 had to be filled with foam. The enclosed cavity formed by the armature 22 takes up a large proportion of the internal space in the envelope and does not need to be filled with foam but still provides a cushioning function because of the structure of this part as a hollow blow-molded component.

Because the tilt axis of the headrest is inside the cover, tilting will be accompanied by relative movement between the rod 14 of the support frame and the headrest cover. To accommodate this, it has been found satisfactory to simply provide a slit 72 in the cover material and in the foam inside. The slit can be cut with a blade so that when the headrest is in its furthest back position, the slit closes itself under the resilience of the foam 26 and is practically invisible. However, when the headrest is tilted forward, the rod 14 can move along the slit and part the foam and the fabric; and when the headrest is tilted back again, the rod moves back along the slit, which then closes up again. In this way a very tidy finish can be achieved to the areas where the rods 14 extend out of the fabric envelope 24.

The blow-molded armature is designed with its ends flatter than its middle, so that the head of the seat occupant is located centrally. Furthermore, the contour of the armature is designed so that when a seat occupant moves vertically (as happens in a crash) the head and neck are able to move smoothly up and down over the headrest.

The use of a blow-molding technique as described here has the following advantages:

1. Because a closed cavity of a substantial size with a smooth outer surface is formed, the volume of foam needed to complete the headrest is at a minimum.
2. Because the walls of the blow-molded body have a certain resilience, and because the internal cavity is vented through the vent 50, the walls of the body can yield to absorb energy.
3. The molding in of threaded inserts as part of the blow-molding process reduces the number of components needed and provides a simple and secure fixing.
4. The formation of the limit stops for the tilting movement as part of the blow-molding avoids the need for separate components to provide this function.

I claim:

1. A headrest for use with a motor vehicle seat, the headrest comprising a blow-molded plastic body, a threaded insert molded in place within the body, a support frame and at least one friction clamp adapted to be connected to the insert and to hold the frame relative to the insert while allowing the insert and the body to tilt, and means defining a re-entrant formation formed as a single part with the body, and the walls of the formation engaging directly with the support frame to limit the extent of tilting.

2. A headrest as claimed in claim 1, wherein the re-entrant formation has faces which make an angle of between 50° and 60° to one another, to limit the available tilting movement of the body on the frame.

3. A headrest as claimed in claim 2, wherein the support frame is made of rod or bar suitably bent to shape.

4. A headrest as claimed in claim 1, wherein the support frame is made of rod or bar suitably bent to shape.

5. A headrest as claimed in claim 1, having two molded-in inserts and two friction clamps.

6. A headrest as claimed in claim 1, wherein the insert has a threaded bore and the clamps are secured to the inserts by threaded fasteners.

7. A headrest as claimed in claim 1, wherein the blow-molded plastic body includes walls and has an aperture through a wall of the body.

8. A headrest as claimed in claim 1, wherein the plastic body is surrounded by a fabric cover, and a layer of foamed-in-place foam material is provided between the cover and the plastic body.

9. A headrest as claimed in claim 8, wherein the fabric and the foam completely surround the support frame where the support frame passes through the fabric and the foam, and the fabric and the foam are slit to allow relative movement between the support frame and the fabric and foam.

10. A headrest as claimed in claim 1, wherein the molded body is of polyethylene or polypropylene to which an adhesion promoting additive has been added.

* * * * *